(12) United States Patent
Bin Jamlus et al.

(10) Patent No.: US 9,065,303 B2
(45) Date of Patent: Jun. 23, 2015

(54) SYSTEM AND METHOD FOR PERFORMING HARMONIC FREQUENCY FILTRATION AND ANALYSIS

(75) Inventors: Norazlin Bin Jamlus, Kula Lumpur (MY); Mazlan Bin Burhanudin, Selangor Darul Ehsan (MY); Amil Azhar Bin Mohd Ali, Selangor Darul Ehsan (MY); Annuar Mohd. Ramli, Darul Ehsan (MY); Nassiruddin Mohamed Sapardi, Kota Damansara (MY); Vijayan S/O Ellappan, Selangor Darul Ehsan (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 552 days.

(21) Appl. No.: 13/339,886

(22) Filed: Dec. 29, 2011

(65) Prior Publication Data

US 2012/0217821 A1  Aug. 30, 2012

(30) Foreign Application Priority Data

Dec. 30, 2010  (MY) .............................. PI 2010006325

(51) Int. Cl.
*H02J 3/00* (2006.01)
*H02J 13/00* (2006.01)
*H02J 3/01* (2006.01)
(52) U.S. Cl.
CPC .............. *H02J 13/0079* (2013.01); *H02J 3/01* (2013.01); *Y02E 40/40* (2013.01); *Y04S 10/527* (2013.01)

(58) Field of Classification Search
CPC ............ H02J 3/01; Y02E 40/40; H04B 15/02
USPC ......................................................... 307/105
See application file for complete search history.

(56) References Cited

U.S. PATENT DOCUMENTS

| 8,068,352 | B2 * | 11/2011 | Yu et al. .......................... 363/17 |
| 8,310,214 | B2 * | 11/2012 | Rivera et al. ................... 323/207 |
| 2007/0179726 | A1 * | 8/2007 | Bickel .............................. 702/69 |
| 2008/0315685 | A1 * | 12/2008 | Mandalakas et al. ........... 307/46 |

* cited by examiner

Primary Examiner — Rexford Barnie
Assistant Examiner — Toan Vu
(74) Attorney, Agent, or Firm — Nath, Goldberg & Meyer; Jerald L. Meyer; Tiffany A. Johnson

(57) ABSTRACT

A system for filtering harmonic frequency distortion in AC power distribution system is disclosed. The system comprises a filter configured to filter harmonic frequency from the AC power, an input sensor configured to acquire harmonic frequency level of the input AC power before filtration, an output sensor configured to acquire harmonic frequency level of the output AC power after filtration, and an interfacing module connected to the input and output sensor for acquiring signals of the harmonic frequency level of the input and output AC power measured by the input and output sensors, respectively. The interfacing module is further configured to process the acquired signals into computer readable data. The computer readable data can be accessed through remote server via IP-based communication network. A method for filtering harmonic frequency distortion of AC power and measuring power quality of the AC power is also disclosed.

7 Claims, 2 Drawing Sheets

SYSTEM AND METHOD FOR PERFORMING HARMONIC FREQUENCY FILTRATION AND ANALYSIS

FIELD OF THE INVENTION

The present invention relates to power distribution. In particular, the present invention relates to a system for filtering and monitoring harmonic frequency level in an AC power distribution system.

BACKGROUND

Electrical energy is delivered to end-users as an Alternating Current (AC) power. An ideal AC power is expected to arrive at frequency known as "fundamental" frequency. Various distribution system and environmental factors can distort the fundamental frequency. When the distortion to the fundamental frequency is arriving as a pattern of periodic waveform with certain frequency, this distortion is known as "harmonic" frequency. The harmonic frequency has a value equivalent to integer multiples of the fundamental frequency. Considered as a noise to the fundamental frequency, the freedom of AC power from this harmonic frequency, usually depicted as "power quality", is therefore an important issue in electrical power distribution system.

The harmonic frequency in an AC power system can cause many problems, such as overheating transformers, reducing electric motor power outputs, causing blackouts, and so forth. When the harmonic frequency distorts the fundamental frequency, the power quality of the AC power is reduced, leading to a reduction in the efficiency and stability of the AC power supply delivered to end-users.

To eliminate the harmonic frequency from the AC power, a filter as disclosed in U.S. Pat. No. 5,567,994 is used. This filter works to provide a component equal or opposite to the undesired harmonic frequency, so that the undesired harmonic component is cancelled.

SUMMARY

In one aspect of the present invention, there is provided a system for filtering harmonic frequency distortion in AC power and measuring the power quality of the AC power, the system comprises a filter for filtering harmonic frequency from the AC power; an input sensor for acquiring an input harmonic frequency level of the AC power before filtration; an output sensor for acquiring an output harmonic frequency level of the AC power after filtration; and an interfacing module connected to the input and output sensor to acquire signals concerning the input/output harmonic frequency level and to process them into a computer readable data.

In one embodiment, the interfacing module comprises a processor for processing the acquired signals into a computer readable data, a database for storing the data processed through the processor and a communicator for transmitting the data to a remote server via IP-based connection.

In an alternative embodiment, the processor in the interfacing module is further connected to a software program resided at the remote server, such that the harmonic frequency level before and after filtration can be viewed by the software program.

In a further embodiment, the data can be viewed through a web-browser remotely. Alternatively, the data can also be viewed onsite through a portable displaying device, such as laptop.

In another aspect of the present invention, there is provided a method of filtering harmonic waveform distortion in AC power and monitoring the power quality of AC power. The method comprises filtering the input AC power; measuring the harmonic frequency level of the AC power before and after filtration; processing and storing the measurement data of the harmonic frequency level of the AC power before and after filtration in an interfacing module; and transmitting the measurement data of the harmonic frequency level of the AC power before and after filtration to a user through web-browser via IP based communication network.

In one embodiment, the measurement data of the harmonic frequency level before and after filtration can be further viewed by software.

BRIEF DESCRIPTION OF THE DRAWINGS

This invention will be described by way of non-limiting embodiments of the present invention, with reference to the accompanying drawings, in which.

DETAILED DESCRIPTION

Figure 1:
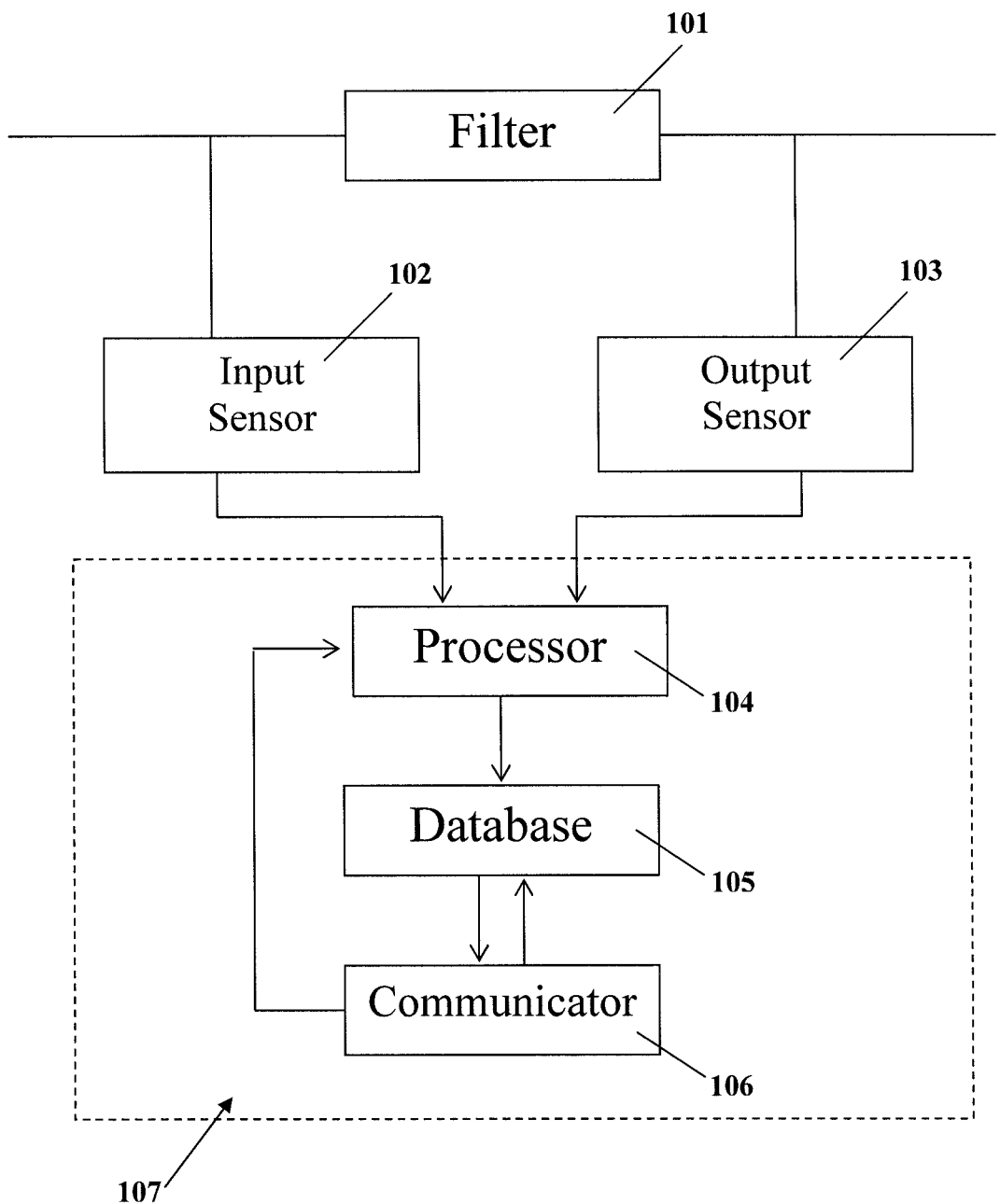
FIG. 1 illustrates a device for acquiring and monitoring harmonic level of an AC power transmission in accordance with one embodiment of the present invention.

The following descriptions of a number of specific and alternative embodiments are provided to understand the inventive features of the present invention. It shall be apparent to one skilled in the art, however that this invention may be practiced without such specific details. Some of the details may not be described in length so as to not obscure the invention. For ease of reference, common reference numerals will be used throughout the figures when referring to same or similar features common to the figures.

As discussed above, when AC input power is distributed for consumption, harmonic frequency is normally introduced as noise to the fundamental AC input power frequency. This harmonic frequency reduces the efficiency of the electrical equipments. To reduce the level of the AC power harmonic frequency, there is a necessity to monitor and filter the harmonic frequency out of the fundamental frequency of AC power.

Methods for filtering harmonic frequency from the AC power are widely known. But it is desired that the AC power distribution can be monitored continuously. Therefore, there is a need for a system and method for acquiring and monitoring the detailed characteristics of the harmonic frequency occurring in an AC power distribution system.

FIG. 1 illustrates a device for filtering and monitoring the level of harmonic frequency according to one aspect of the present invention. The device (100) comprises a filter (101) to filter input AC power; an input sensor (102) for monitoring the harmonic level of the AC power before filtration, an output sensor (103) for monitoring the harmonic level of the AC power after filtration, and an interfacing module (107) for data processing and data communication purpose. The interfacing module (107) further comprises a processor (104), a database (105), and a communicator 106. The processor (104) receives signals from the input/output sensors (102), (103) and processes the same into computer readable data. These data are stored in the database (105) for further processing. The data captured and process through the processor (103) can be transmitted to a remote server and/or onsite displaying device through the communicator (106). Preferably, interfacing module (107) provide a web-access platform allowing the data to be accessed in a hypertext form over the Internet.

Figure 2:
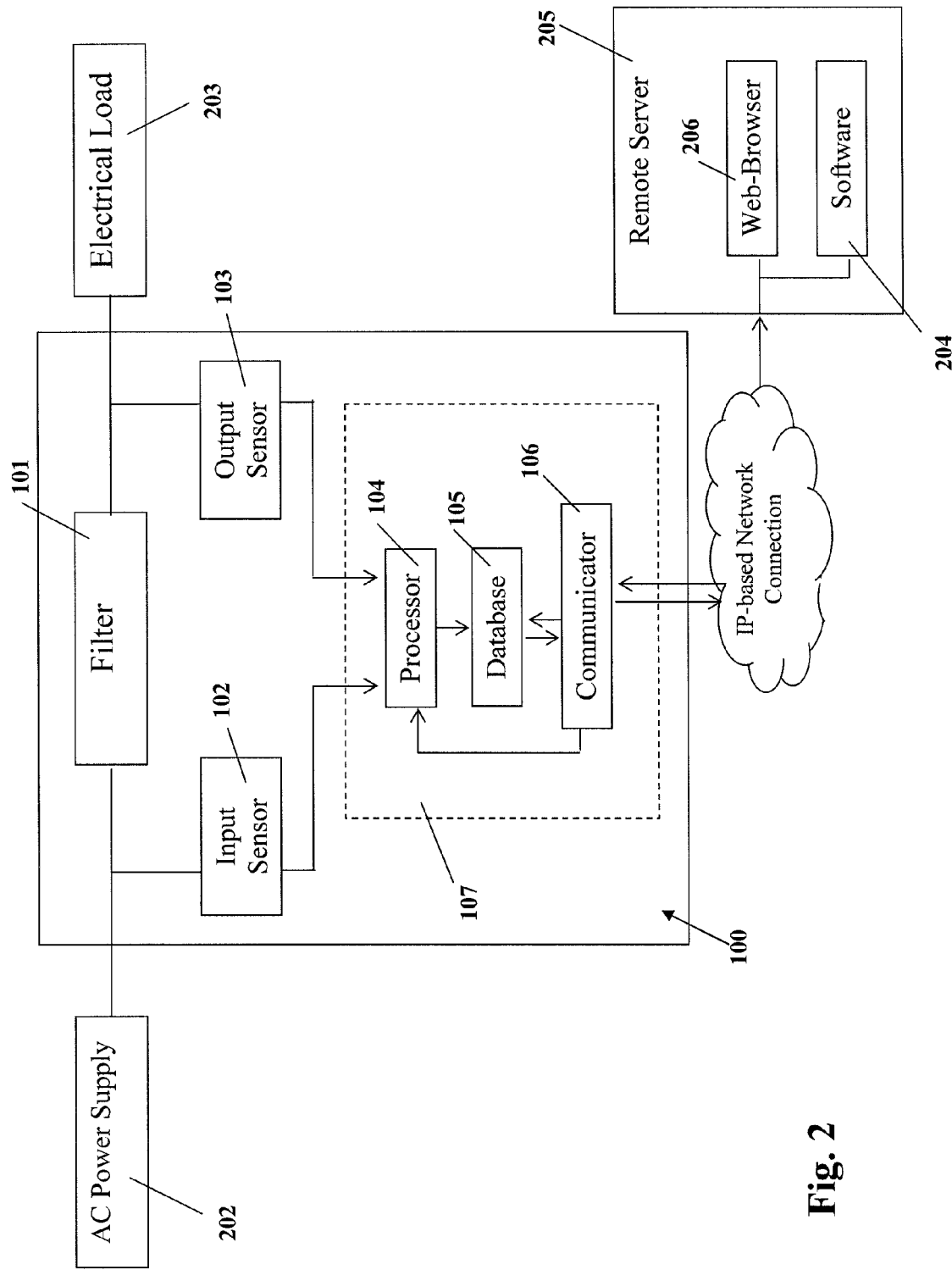
FIG. 2 illustrates a system utilizing the device shown in FIG. 1 for filtering and monitoring the harmonic level of AC power according to one embodiment of the present invention

FIG. 2 illustrates a system utilizing the device (100) of in FIG. 1 for filtering and monitoring the harmonic level of AC power according to one embodiment of the present invention. One end of the device (100) is connected to an input terminal of AC power supply (202) and the other end is connected to an electrical load (203). The AC power supply (202) is the supplier of electrical AC power, in which this electrical power is going to be delivered to the electrical load (203).

Still referring to FIG. 2, as the input electrical power from AC power supply (202) is entering the device (100), the input sensor (102) is measuring the harmonic frequency level of the input AC power, while the filter (101) filters the harmonic frequency of the AC power. After filtration, the output sensor (103) measures the harmonic frequency level of the filtered AC Power, and the filtered AC power is transmitted to electrical load (203). The measurement signals of the harmonic frequency level of the AC Power before and after filtration are then fed to the interfacing module (107) of the device (100). In the interfacing module (107), the processor (104) processes the measurement signals into a computer readable data. The processed data is collected and stored in the database (105). The processed data may further be continuously logged for a time period and stored according to the time period in the database (105). The processed data can be viewed onsite by a user through a portable device, such as a laptop adapted to access the database (105) directly. The portable device can be connected to the device (100) through RS232 connection.

The device 100 can further be accessed by a remote server (205) through the communicator (106) via IP-based communication network. When the device (100) is accessed remotely, the data stored in the database (105) can be retrieved accordingly. User may view the data through a web browser (206) that resides on the remote server (205). It is also possible that the data processed by the processor (104) can also be accessed in real-time through the remote server (205). The remote server (205) may further be configured to retrieve and achieve the data stored on the database (105) at a prescribed time period.

To access the device (100) through the web-browser (206), user may require authorization in order to access the data.

Still referring to FIG. 2, the data stored in the database (105) can also be viewed using a software (204) resided on the remote server (205). By using the software (204), which has a GUI interface on it, user is able to extract and view the data from the database (105). Alternatively, the software (204) is also able to retrieve the data and store them in any desired format such as any spreadsheet format or any database table format. The software (204) may provide more control and flexibility for processing the data. For example, the data can be stored in a format that is recognized by commercially available software, such as Microsoft Excel®. With these commercially available software, the data can be processed and interpret more easily by the users. The data can be easily processed and presented in a more complex graphical form for analysis.

In a further embodiment, the remote server (205) connected to the device (100) via the communicator (106) is also adapted to control parameters of the device (100).

Prior to usage, the device (100) will be mounted and installed in a panel cabinet. The device (100) can be dismantled and reassembled at ease for the maintenance purpose. Components used in the device (100) are customisable; hence design of the device (100) can be adjusted according to user's needs. Moreover, the design of the device (100) is robust with coils and capacitors that can withstand high current surges and spike.

In one embodiment, the device (100) is designed to cater a system with amperage rating of 1800 A and able to withstand surges and spike as high as 1000 volt. With the currently state of the art, the size and the weight of device (100) are considerably small with its substantially high amperage level of 1800 A.

Aside from a system with amperage level of 1800 A, such device (100) can also be utilized to cater other system with different amperage rating. To do so, components of the filter of the device (100) can be replaced so as to suite desired amperage level. Typically, The device life expectancy is calculated in relation to components that are used in device (100). Components degrade due to time and intensity of the problem occurs on a site. With the device (100) installed onsite, the AC supply quality can be monitored closely, and more important, remotely. The remote server (205) can easily monitor multiple sites simultaneously through the device (100) installed respectively. Such remote monitoring could save up on operational cost. Stable AC supply reduces the breakdown of equipments and glitches in the system, it also reduces overheating on transformers and etc. Therefore, the parts of the equipments including cables connected to the electrical network will last longer and hence increases the life expectancy of the equipments.

It is desired that the components used for the device (100) is customised according to the need and the design, so that the size of the device, or even the entire electrical network system can be reduced. The device (100) design specifically to cater for a specific power rating rather than all ranges can help to reduce the size significantly.

The above description illustrates various embodiments of the present invention along with examples of how aspects of the present invention may be implemented. While specific embodiments have been described and illustrated it is understood that many charges, modifications, variations and combinations thereof could be made to the present invention without departing from the scope of the present invention. The above examples, embodiments, instructions semantics, and drawings should not be deemed to be the only embodiments, and are presented to illustrate the flexibility and advantages of the present invention as defined by the following claims:

The invention claimed is:

1. A system for filtering harmonic frequency distortion in AC power and measuring the power quality of the AC power, the system comprising:
   a filter for filtering harmonic frequency from the AC power; wherein the filter is connected to an input terminal of AC power supply at one end and connected to an electrical load at a second end;
   an input sensor positioned upstream of the filter so as to acquire an input harmonic frequency level of the AC power before filtration;
   an output sensor positioned downstream of the filter so as to acquire an output harmonic frequency level of the AC power after filtration; and
   an interface module comprising a processor and a database; wherein the interface module is connected to the input sensor and the output sensor to acquire signals concerning the input/output harmonic frequency levels; wherein the processor processes the acquired signals into a computer readable data and wherein the database stores the data processed through the processor.

2. A system according to claim 1, wherein the interfacing module further comprises a communicator for transmitting the data stored in the database to a remote server via IP-based connection.

3. A system according to claim 1, wherein the processor in the interfacing module is further connected to a remote server including a software program residing within the remote server, such that the harmonic frequency level before and after filtration can be viewed by applying the software program.

4. A system according to claim 1, wherein the computer readable data are viewed through a web-browser remotely.

5. A system according to claim 1, wherein the data can be viewed onsite through a portable displaying device.

6. A method of filtering harmonic waveform distortion in AC power and monitoring the power quality of AC power, the method comprising:
   filtering an input AC power;
   measuring the harmonic frequency level of the AC power before and after filtration;
   processing and storing the measurement data of the harmonic frequency level of the AC power before and after filtration in an interfacing module;
   transmitting the measurement data of the harmonic frequency level of the AC power before and after filtration to a user through web-browser via IP based communication network.

7. A method according to claim 6, wherein the measurement data of the harmonic frequency level before and after filtration are viewed by a displaying device.

\* \* \* \* \*